United States Patent [19]

Moorman et al.

[11] Patent Number: 4,929,462
[45] Date of Patent: May 29, 1990

[54] METHOD AND APPARATUS FOR CONTINUOUS CONTACT OF SUPERCRITICAL FLUID WITH PARTICULATE SOLIDS

[75] Inventors: Charles T. Moorman, Harrington Park; Joseph L. Sabadics, Nutley; Joseph A. Bruscino, Saddle Brook, all of N.J.

[73] Assignee: Kraft General Foods, Inc., Glenview, Ill.

[21] Appl. No.: 368,729

[22] Filed: Jun. 21, 1989

[51] Int. Cl.⁵ .......................... A23F 5/20; B01D 11/02
[52] U.S. Cl. ...................... 426/478; 99/516; 99/283; 422/261; 426/427; 426/481
[58] Field of Search ............... 426/478, 479, 424, 427, 426/432, 434, 481; 422/261, 267; 99/516, 283

[56] References Cited

U.S. PATENT DOCUMENTS

| | | | |
|---|---|---|---|
| 3,088,394 | 5/1963 | Thornhill | 99/283 |
| 3,092,515 | 6/1963 | Pike et al. | 422/261 |
| 4,322,445 | 3/1982 | Peter et al. | 426/481 |
| 4,728,525 | 3/1988 | Toro et al. | 426/427 |
| 4,820,537 | 4/1989 | Katz | 426/478 |

Primary Examiner—George Yeung
Attorney, Agent, or Firm—Daniel J. Donovan; Thomas R. Savoie

[57] ABSTRACT

Method and apparatus for contacting particulate solid matter with a fluid in a pressure vessel through which the fluid continuously moves at high, supercritical, pressure while the particulate solid matter is periodically moved via isolatable pressurizable vessels which are periodically pressurized and de-pressurized to and from the supercritical pressure to facilitate periodic movement of the particulate solids between the pressure vessel and the isolatable pressurizable vessels. A supply of the fluid is maintained at an intermediate pressure at which the fluid exists in both the liquid and gaseous states. The pressurizable vessels are raised to supercritical pressure by first using intermediate pressure fluid in the gaseous state and then in the liquid state, followed by introducing fluid at the supercritical pressure. The vessels are de-pressurized by first venting and then pumping to the intermediate pressure fluid supply.

31 Claims, 1 Drawing Sheet

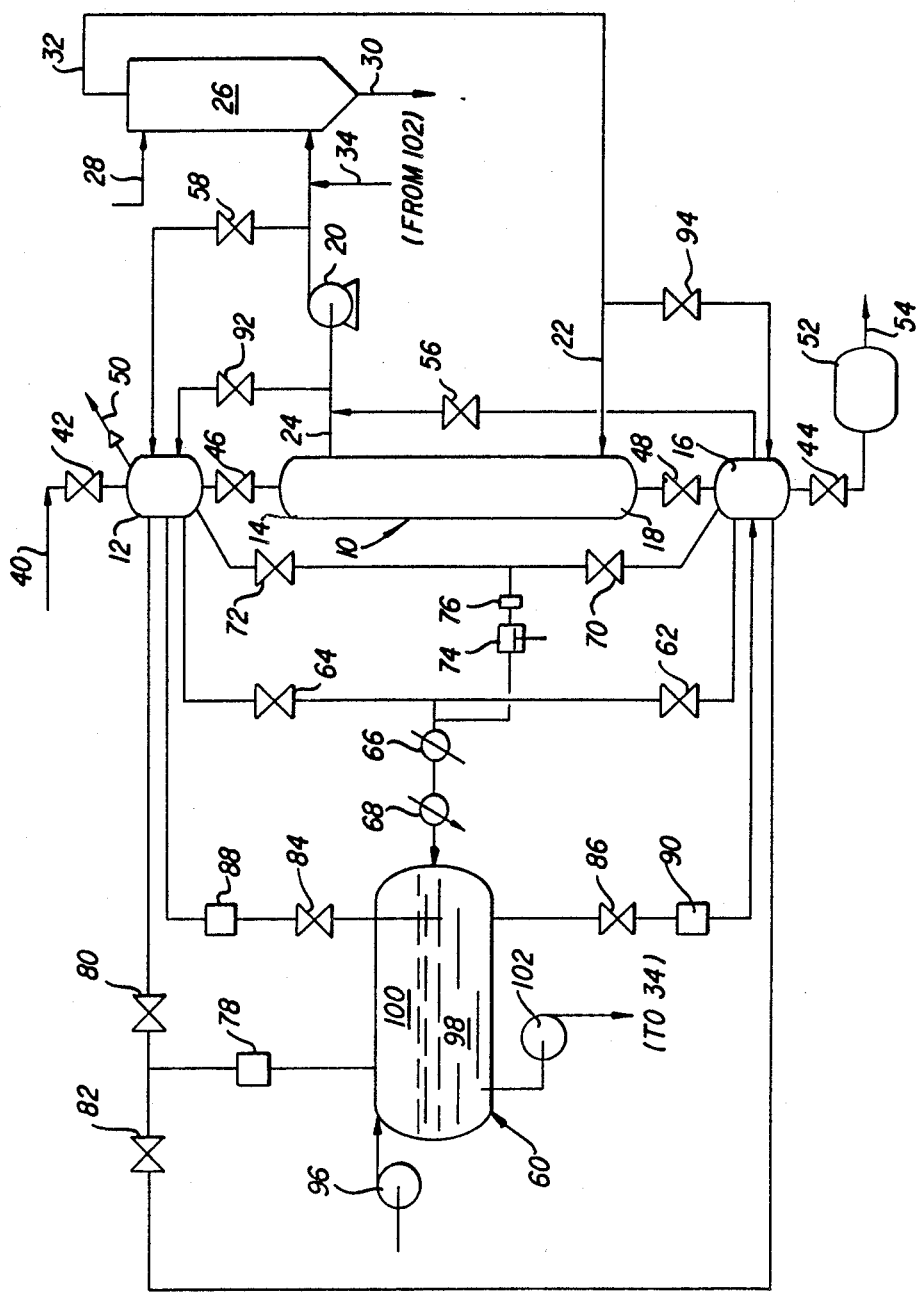

METHOD AND APPARATUS FOR CONTINUOUS CONTACT OF SUPERCRITICAL FLUID WITH PARTICULATE SOLIDS

The present invention relates to methods and apparatus for continuously contacting particulate solid with a fluid at high pressure. More particularly, the invention relates to such methods and apparatus for continuous contact of particulate solids, such as moist green coffee beans with a supercritical fluid. Still more particularly, the invention relates to such methods and apparatus for extracting caffeine from green coffee beans using supercritical carbon dioxide.

BACKGROUND OF THE INVENTION

Methods and apparatus for contacting solids and liquids are well known. Typical examples include flowing a fluid through a bed of particulate solids held in a column. In most such column operations, a fixed bed or batch of solids may be treated with a continuously flowing liquid. It is also known to continuously move the solids while continuously flowing a fluid in contact therewith, either concurrently or countercurrently. It is also known to contact the solids with fluid under pressure, and the pressure of the fluid may be quite high, such as 100 atmospheres or more. In order to introduce the solids into a high pressure vessel for contact with the treating fluid, it is necessary to pass the solids through air locks or the like. While such systems are known, they are not in widespread use, particularly as the treatment pressure increases.

In recently issued U.S. Pat. No. 4,820,537, to Saul N. Katz, there is disclosed a process wherein particulate solids in the form of green, moist, coffee beans, are continuously contacted with supercritical carbon dioxide at a pressure of, for example, about 250 atmospheres. The disclosure of the Katz patent is incorporated by reference herein. Further details concerning the pulsed column operation described in the Katz patent is given in co-pending application Ser. No. 07/229,380, filed Aug. 5, 1988, the disclosure of which is incorporated herein by reference.

In the previously known pulsed column method, a supercritical fluid is passed continuously through an elongate pressure vessel at supercritical pressure while solid particulate matter is pulsed periodically into and out of the pressure vessel via upper and lower isolatable pressurizable vessels called blowcases. The pressurizable vessels are pressurized to the operating pressure of the main pressure vessel to permit introduction of a quantity of particulate solids from the upper pressurizable vessel into the main pressure vessel, and to permit simultaneous discharge of a corresponding quantity of particulate solids out of the main pressure vessel into the lower pressurizable vessel. In other words, in order to move a quantity of particulate solids into and out of the main pressure vessel, two auxiliary vessels are first brought up to operating pressure. Once at that pressure, the particulate solids can be moved by gravity flow into and out of the main column. Similarly, the blowcases must be depressurized to permit introduction of a fresh quantity of particulate solids into the upper blowcases, and to permit discharge of treated solids from the lower blowcases (after again being pressurized).

In an application of the system just described for the extraction of caffeine from moist green coffee beans with supercritical carbon dioxide, the blowcases are relatively large in size, and require a considerable amount of supercritical carbon dioxide. If all of the supercritical carbon dioxide is simply vented to depressurize the blowcases, there is a considerable cost requirement, both with respect to material and energy, in bringing the blowcases back up to operating pressure for movement of the coffee beans into and out of the extraction column. It is an object of the present invention to provide an improved method and apparatus for continuous contact of supercritical fluid with particulate solids. It is a further object to provide an improved method for pressurizing and depressurizing blowcases utilized in such processes. It is still a further object of the invention to provide improved methods and apparatus for movement of particulate solids in such systems.

BRIEF SUMMARY OF THE INVENTION

The foregoing and other objects which will be apparent to those having ordinary skill in the art are achieved in accordance with one aspect of the present invention by providing in a method of contacting a particulate solid with a fluid in an elongate pressure vessel which comprises continuously passing a supercritical fluid through an elongate pressure vessel at supercritical pressure while periodically moving solid particulate matter through the pressure vessel via isolatable pressurizable vessels, said pressurizable vessels being periodically pressurized to the supercritical pressure of said fluid for facilitating the periodic movement of particulate solids between said pressurizable vessels and said pressure vessel, and depressurized for facilitating the periodic movement of said solid particulate matter into and out of said pressurizable vessels, the improvement wherein pressurizing said pressurizable vessels comprises:

(a) maintaining a supply of said fluid at an intermediate, non-critical pressure, at which pressure said fluid exists in both the liquid and gaseous state;

(b) introducing into said pressurizable vessels said fluid, in the gaseous state, from said supply of said fluid maintained at said intermediate pressure, to raise the pressure within said pressurizable vessels;

(c) introducing into said pressurizable vessels said fluid, in the liquid state, from said supply of fluid to further raise the pressure within said vessels to approximately the pressure of the fluid in said supply; and (d) introducing, into said pressurizable vessels, said fluid in the supercritical state, to further raise the pressure within said vessels to the supercritical state.

In another aspect, the foregoing improvement further comprises (e) venting supercritical fluid from said pressurizable vessels to said fluid supply whereby the pressure in said pressurizable vessels is reduced to substantially said intermediate pressure;

(f) pumping fluid from said pressurizable vessels into said fluid supply to lower the pressure in said pressurizable vessels below said intermediate pressure; and (g) venting at least one of said pressurizable vessels to atmosphere.

In a further aspect the invention comprises, in a method of introducing particulate solid matter into a pressure vessel through which a fluid continuously flows at high, supercritical, pressure, which comprises introducing the particulate solid matter into an isolatable pressurizable vessel, isolating said pressurizable vessel, increasing the pressure within said pressurizable vessel until the pressure therein is substantially the same as that of the supercritical fluid in said pressure vessel, and discharging the particulate solids from said pressurizable vessel to said pressure vessel, the improvement which comprises:

(a) maintaining a supply of said fluid at an intermediate, non-supercritical pressure, at which pressure said fluid exists in both the liquid and gaseous state;

(b) introducing into said pressurizable vessel said fluid, in the gaseous state, from said supply of said fluid maintained at said intermediate pressure, to raise the pressure within said pressurizable vessel;

(c) introducing into said pressurizable vessel said fluid, in the liquid state, from said supply of fluid to further raise the pressure within said vessel to approximately the pressure of the fluid in said supply;

(d) introducing, into said pressurizable vessel, said fluid in the supercritical state, to further raise the pressure within said vessel to the high, supercritical, pressure prevailing in said pressure vessel; and (e) placing the pressurizable vessel and pressure vessels in communication for introducing particulate solids to said pressure vessel from said pressurizable vessel.

In a further aspect, the invention comprises, in a method of discharging particulate solid matter into an isolatable pressurizable vessel from a pressure vessel through which a fluid continuously flows at high, supercritical, pressure which comprises isolating said pressurizable vessel, measuring the pressure in said pressurizable vessel until the pressure therein is substantially the same as that of the supercritical fluid in said pressure vessel, and discharging solids from said pressure vessel to said pressurizable vessel, the improvement which comprises (a) maintaining a supply of said fluid at an intermediate, non-supercritical pressure, at which pressure said fluid exists in both the liquid and gaseous state;

(b) introducing into said pressurizable vessel said fluid, in the gaseous state, from said supply of said fluid maintained at said intermediate pressure, to raise the pressure within said pressurizable vessel;

(c) introducing into said pressurizable vessel said fluid, in the liquid state, from said supply of fluid to further raise the pressure within said vessel to approximately the pressure of the fluid in said supply;

(d) introducing, into said pressurizable vessel, said fluid in the supercritical state, to further raise the pressure within said vessel to the high, supercritical pressure prevailing in said pressure vessel; and (e) placing the pressurizable vessel and pressure vessel in communication for discharging particulate solids from said pressure vessel to said pressurizable vessel.

In a further aspect, the invention comprises, in apparatus for continuously passing a fluid at high operating pressure through a pressure vessel for contacting particulate solids in said pressure vessel while periodically moving particulate solids downwardly through said pressure vessel, said apparatus comprising:

a pressure vessel;

an upper pressurizable vessel receiving particulate solids at substantially atmospheric pressure and for charging said solids into said pressure vessel at said high operating pressure;

a lower pressurizable vessel for receiving a quantity of particulate solids discharged from said pressure vessel at said high operating pressure and for discharging said particulate solids at low pressure;

means for continuously passing a fluid at high operating pressure through said pressure vessel for contacting particulate solids therein;

means for periodically increasing the pressure in said upper and lower pressurizable vessels to facilitate periodic charging of particulate solids from said upper pressurizable vessel into the upper end of said pressure vessel and periodic discharging of particulate solids from the lower end of said pressure vessel into said lower pressurizable vessel;

means for periodically decreasing the pressure in said upper and lower pressurizable vessels to facilitate introduction of particulate solids into said upper pressurizable vessel at atmospheric pressure and periodic discharge of particulate solids from said second pressurizable vessel at low pressure;

the improvement wherein said apparatus further comprises:

an intermediate pressure vessel for storing said fluid at an intermediate pressure which is substantially greater than atmospheric pressure and substantially less than said high operating pressure;

wherein said means for periodically increasing said pressure in said upper and lower pressurizable vessels comprises:

means for conveying fluid in the gaseous state from said intermediate pressure vessel to said upper and lower pressurizable vessels to raise the pressure therein to said intermediate pressure; and means for conveying said fluid at said high operating pressure to said upper and lower pressurizable vessels to raise the pressure therein to said high operating pressure; and wherein said means for decreasing the pressure in said upper and lower pressurizable results comprises:

means for conveying fluid at said high operating pressure from said upper and lower pressurizable vessels to said intermediate pressure vessel to lower the pressure to said intermediate pressure; and means for pumping said fluid from said upper and lower pressurizable vessels into said intermediate pressure vessels to lower the pressure below said intermediate pressure.

In a further aspect the invention comprises, in apparatus for continuously contacting particulate solids in an elongate column by continuously flowing a supercritical fluid at high pressure through a bed of solids in the column while periodically moving the particulate solids downwardly through the column, said apparatus comprising:

an elongate, substantially vertical pressure vessel;

an upper isolatable pressurizable vessel for periodically introducing particulate solids into the top of the pressure vessel;

means for increasing the pressure in said upper pressurizable vessel to said high pressure for introduction of particulate solids from said upper pressurizable vessel to said pressure vessel;

means for decreasing the pressure in said upper pressurizable vessel from said high pressure vessel for introduction of a fresh supply of particulate solids to said pressurizable vessel;

a lower isolatable pressurizable vessel for periodically receiving particulate solids discharged from the lower end of the pressure vessel;

means for increasing the pressure in said lower pressurizable vessel to said high pressure for receiving particulate solids discharged from said pressure vessel;

means for decreasing the pressure in said lower pressurizable vessel from said high pressure for discharging particulate solids from said lower pressurizable vessel; and pump means for continuously circulating a flow of supercritical fluid at high pressure through said column for contacting particulate solids therein;

the improvement wherein said apparatus further comprises:

means for interconnecting the outlet side of said circulating pump means in fluid communication with said upper pressurizable vessel for facilitating discharge of particulate solids from said upper pressurizable vessel into said pressure vessel; and means for interconnecting the inlet side of said circulating pump means in fluid communication with said lower pressurizable vessel for facilitating discharge of particulate solids from said pressure vessel into said lower pressurizable vessel.

DETAILED DESCRIPTION OF PREFERRED EMBODIMENTS

There follows a detailed description of a preferred embodiment of the invention with reference to the drawing which is a diagrammatic flow sheet of apparatus and a method in accordance with the invention.

The drawing illustrates apparatus of the type generally disclosed in the Katz patent and in the Katz, et al. patent application mentioned above. The apparatus includes a main pressure vessel 10 in the form of an elongate, substantially vertical, column. A first, upper, pressurizable vessel 12, commonly called a blowcase, is provided above the upper end 14 of column 10. Upper blowcase 12 is used for the introduction of a quantity of particulate solids, in this case moistened green coffee beans, into pressure vessel 10. A second, lower pressurizable blowcase vessel 16 is provided below the lower end 18 of main pressure vessel 10 and is positioned to receive a quantity of particulate solids discharged from the lower end of the main pressure vessel. A circulating pump 20 is provided for passing a fluid at high operating pressure, such as supercritical carbon dioxide at 200-300 atmospheres, into and through the pressure vessel for contacting particulate solids therein such as moist green coffee beans.

In contacting moistened coffee beans with supercritical carbon dioxide, the supercritical fluid is pumped into the lower end of the pressure vessel via conduit 22, and exits the upper end of the vessel via conduit 24. The supercritical carbon dioxide introduced into the lower end of the main pressure vessel 10 contacts the moistened, green coffee beans in the column and extracts caffeine. Thus, the supercritical carbon dioxide stream leaving the vessel via line 24 is loaded with caffeine. Caffeine is removed from the stream in any suitable manner such as by contact in water column 26.

In column 26, the supercritical carbon dioxide is contacted with water introduced via line 28. Caffeine is extracted by the water, and water enriched with caffeine is discharged via line 30. Supercritical carbon dioxide, from which caffeine has been removed, leaves the water column via line 32 through which it is conveyed to and through column 10 and to the inlet of circulation pump 20. Make-up supercritical carbon dioxide is introduced via line 34.

While various methods are available for removing the caffeine from the supercritical carbon dioxide, it is preferred to retain the carbon dioxide in a supercritical state, and to recirculate it, via pump 20, to the main treatment vessel 10 for extraction of caffeine from the green coffee beans. Water absorption is a preferred technique and a preferred water absorption column system is described in co-pending application Ser. No. 07/229,369, filed Aug. 5, 1988, the disclosure of which is incorporated herein by reference.

From the foregoing, it will be understood that a continuous flow of supercritical carbon dioxide moves upwardly through column 10 to extract caffeine from the moistened green coffee beans which are present in the column. As mentioned above, the beans are periodically moved downwardly, in pulses, through the column. Thus, the flow of supercritical carbon dioxide through the treatment column is continuous, and it is not required to shut down the column in order to process fresh beans. Moistened coffee beans are introduced from a hopper, not shown, through conduit 40 and valve 42, into upper blowcase 12. Suitable green beans include Arabicas from Brazil, Colombian Milds, African Robustas, or mixtures thereof. The beans are moistened in any suitable manner to a moisture content of about 25-50%. Typically, the beans are first steamed to a moisture content of about 15%, and a bean temperature of about 150° F. Water is then progressively added to reach the desired moisture content. Chaff may be removed in any suitable manner such as by passing the moist beans through a washer.

A key characteristic of the process is that the bean feed, at atmospheric pressure, must be introduced into an extraction system typically operating at about 4400 psig, and that the extracted (decaffeinated) bean product must subsequently be brought back down to atmospheric pressure to leave the system. This leads to an arrangement whereby beans are handled in batches or "pulses" by means of the blowcases or lock-hoppers which are periodically depressured to receive or discharge beans and then pressured with $CO_2$ up to extraction system pressure to permit gravity transfer of beans into and out of the high pressure system. The extraction system, meanwhile, operates continuously with supercritical $CO_2$ circulating countercurrently to bean flow through extractor column 10, which always holds a plurality of pulses of beans, preferably about 5-15 pulses and more preferably about 10 pulses of beans.

The continuously circulating supercritical $CO_2$, having extracted about 98% of the caffeine from the beans, is in turn countercurrently contacted with water in the water absorber 26 at full system pressure in order to transfer caffeine from the $CO_2$ to water. The caffeine-free $CO_2$ is recycled to the extractor column 10 and the aqueous caffeine solution is let down in stages to about 35 psig, and treated for removal of caffeine, preferably by reverse osmosis as disclosed in co-pending application Ser. No. 07/229,773 filed Aug. 5, 1988, the disclosure of which is incorporated herein by reference.

The continuously operating high pressure extraction system, consisting essentially of the extractor, water absorber 26 and $CO_2$ circulation pump 20 is conveniently referred to as the high pressure loop. This high pressure loop is preferably maintained at substantially isothermal and substantially isobaric conditions, as it is an advantage of the present system, unlike a batch system, that the high pressure loop is not required to undergo thermal or pressure cycling. In the processing of moistened green coffee beans, for example, a suitable operating pressure is about 250 atmospheres, and a suitable operating temperature is about 100° C. In a batch system, the main pressure vessel will thus undergo extensive thermal and pressure variation with each cycle. In the present system, the main pressure vessel may be operated at substantially constant temperature and pressure, and thermal and pressure cycling is confined to the relatively smaller blowcases. The present system thus provides optimum capacity and productivity and at the same time minimizes capital equipment cost.

The cyclic depressurizing and pressuring of the blowcases requires a supporting system to enable $CO_2$ to be recovered during depressuring, condensed and returned to the blowcases and high pressure loop. This supporting system functions at subcritical conditions selected to permit condensation of liquid $CO_2$. Surge capacity, as required to accommodate the swings in $CO_2$ inventory in the blowcases during the depressuring/pressuring cycle is provided as liquid $CO_2$ storage in a $CO_2$ working vessel. The temperature level for $CO_2$ condensation is preferably selected to be compatible with an available cooling medium (such as chilled water at 46° F.) and to stay above the temperature range at which solid $CO_2$-$H_2O$ hydrates will form (45° to 55° F.).

In a typical operation, green beans, moistened to about 40 wt% $H_2O$ and cleaned for removal of chaff, are pneumatically conveyed, continuously, into a bean feed hopper. Beans are periodically dropped by gravity into the top blowcase 12.

Bean feeding into the processing system starts with the top blowcase 12 empty (except for a heel of beans) at essentially atmospheric pressure and with the bottom blowcase 16 at approximately 30 psig and full of beans. A vent 50 in blowcase 12 is open to atmosphere and the outer valves 42 and 44 and inner valves 46 and 48 are all closed. The outer valves are then opened, allowing beans to drop by gravity into upper blowcase 12, with displaced $CO_2$ leaving through vent 50 to atmosphere.

At the same time, beans drop from bottom blowcase 16 into product hopper 52 assisted by the $CO_2$ pressure in blowcase 16. Carbon dioxide is preferably not vented from either blowcase 16 or product hopper 52, so pressure equalizes in the two vessels at roughly 10–15 psig. The outer valves 42 and 44 and vent 50 are then closed.

Decaffeinated beans are continuously discharged from hopper 52 via line 54. The residual $CO_2$ pressure in hopper 52 bleeds down to atmospheric pressure as the beans are discharging prior to the next cycle.

The top blowcase 12 is now full of moistened beans and the bottom blowcase 16 is empty. Both blowcases are then pressurized with $CO_2$ up to system pressure as described in detail below. The beans can then be moved from the top blowcase to the extractor column and from the extractor column to the bottom blowcase. This operation is called pulsing. The inner valves 46 and 48 are opened, allowing the extractor bean bed to start moving downwardly. Bean pulsing is enhanced by transferring $CO_2$ displaced by beans entering bottom blowcase 16 up to upper blowcase 12 to replace the beans leaving upper blowcase 12 and/or by increasing the $CO_2$ flow above the simple displacement rate. Both are accomplished by briefly speeding up $CO_2$ circulation pump 20 and simultaneously opening flow control valves 56 and 58 to enable a flow of supercritical $CO_2$ to flow from lower blowcase 16 to pump suction and from pump discharge to upper blowcase 12. With the aid of this pulse flow a batch or pulse of decaffeinated beans flows from extractor column 10 to fill lower blowcase 16 while an equal volume of beans flows from upper blowcase 12 to keep the extractor full of beans. $CO_2$ circulation and caffeine extraction continue uninterrupted during pulsing although there may be a brief dip in net upward $CO_2$ flowrate through the extractor. The pulse flow control valves 56 and 58 are then closed, followed by the inner valves 46 and 48. The blowcases are then ready for depressurization, following which the above-described bean movement cycle can start again.

Both blowcases are at extractor pressure, with top blowcase 12 empty of beans (except for a heel) and bottom blowcase 16 full of beans. All related valves are closed. Depressurization is then carried out in four steps: $CO_2$ letdown into a $CO_2$ working vessel 60; further letdown into the suction system of $CO_2$ recovery compressors 74; evacuation of the blowcases to a fairly low pressure by compressors 74; and venting the top blowcase to atmosphere.

In the first step, 4000+ psig $CO_2$ flows simultaneously from both blowcases, preferably at controlled rates through throttling valves 62, 64 which are preferably averaging valves. The $CO_2$ flows through $CO_2$ cooler 66 where it is cooled by cooling water to about 105° F., condenses at about 72° F. in condenser 68, cooled by chilled water, and accumulates as liquid in $CO_2$ working vessel 60 at an intermediate pressure, suitably about 850 psig. When the pressure in the blowcases has dropped to slightly above the pressure in intermediate pressure vessel 60, this step is complete.

In the second step, both blowcases are further pressurized into the C-101A&B suction system through a second set of averaging valves 70, 72. The $CO_2$ recovery compressors 74, up to this point, having been idling at about 100 psig suction and discharge, with total recycle from each stage discharge back to its suction. As $CO_2$ flow comes in from the blowcases, the compressors are idling, but pressure at suction and throughout the system is still rising. As the $CO_2$ from the blowcases is depressurized, its temperature drops sharply. Initially it drops well below 0° F. and the $CO_2$ is in fact partly liquefied. This stream is heated to 70° F. in heater 76 before going to compression in order to vaporize liquid, as well as any solid $CO_2$-$H_2O$ hydrate which may be present. As pressure in the compressor suction system builds up, however, the depressurized $CO_2$ gets warmer and in fact the $CO_2$ can get above the acceptable temperature (about 90° F.) for feeding the compressors. Therefore, provision is preferably made for quenching with $CO_2$ liquid from vessel 60.

As the pressures in the blowcases and compressor suction system approach equalization, which may be, for example, in the neighborhood of about 600 psig, the third step of depressurization is begun. This is initiated by simply closing the recycle (idling) valves of compressor 74 so that the $CO_2$ can be compressed and sent forward to vessel 60. The compressed $CO_2$ is cooled in cooler 66, condensed in condenser 68, and accumulated as liquid in vessel 60. During this step the blowcases and compressor suction system are preferably evacuated down to a pressure level of about 50 or below psig. This pressure level has been selected on economic grounds; a lower pressure level would leave less $CO_2$ to be discarded to atmosphere but would require higher compression capacity and more stages. When the target pressure level is reached the compressors are returned to idling and the blowcase valves are all closed.

The final step of depressurization is simply to vent the top blowcase 12 to atmosphere, ready for a new batch of beans. As described above, the bottom blowcase 16 does not get vented below 50 or below psig until beans are discharging.

As noted above, the blowcases must be brought up to system pressure before beans can be moved through the extractor. At this point, the top blowcase 12 is at atmospheric pressure and full of beans, bottom blowcase 16 is at atmosphere to 15 psig and empty of beans, and both are isolated from the high pressure loop. Pressurization is then carried out in three steps: charging with $CO_2$ vapor from vessel 60; charging with $CO_2$ liquid from vessel 60; and filling with supercritical $CO_2$ from the high pressure loop.

In the first step, $CO_2$ vapor from vessel 60 is preheated to about 95° F. by $CO_2$ fill heater 78 and simultaneously fed to blowcases 12 and 16 through averaging valves 80 and 82 until blowcase pressure reaches about 150 psig. The slight preheat is used so that the $CO_2$ will not get too cold and liquefy as it is let down from working vessel pressure. Then averaging valves 80 and 82 are closed. This step raises the pressure in the blowcases to a value which significantly reduces the cooling effect that would otherwise result if liquid or supercritical $CO_2$ were introduced into the blowcase without having first raised the pressure therein.

In the second step, $CO_2$ liquid is simultaneously fed to upper and lower blowcases 12 and 16 by pressure letdown and gravity flow through averaging valves 84, 86. This step introduces a considerable bulk of $CO_2$ into the blowcases, and raises the pressure in the blowcases substantially to the intermediate pressure in vessel 60 which significantly reduces the drop in pressure and temperature that would result in the high pressure loop if supercritical $CO_2$ were introduced into the blowcases without having first raised the pressure therein. Heaters 88 and 90 are provided to add pre-heat to the liquid $CO_2$ flowing to blowcases 12 and 16 as required to prevent formation of solids. $CO_2$ input is continued until $CO_2$ pressure in blowcases 12 and 16 is fairly close to working vessel pressure. Then averaging valves 84, 86 are closed. Pressure in the $CO_2$ working vessel will normally drop, for example about 150 psi, during these steps because of the rapid withdrawal of $CO_2$ vapor and liquid from vessel 60.

In the final pressurization step, the blowcases are brought up to extractor pressure by drawing supercritical $CO_2$ from the high pressure loop through averaging valves 92, 94. The top blowcase is fed from the main $CO_2$ circulating line 24 leaving the extractor and the bottom blowcase is fed from the main $CO_2$ circulating line 22 entering the extractor. When blowcase pressure closely approaches loop pressure, maximum filling has been obtained and valves 92, 94 are closed. The loop pressure will normally drop, for example about 450 psi during this step because of the rapid withdrawal of $CO_2$. The blowcases can then go into the bean pulsing step as described above.

In general, the volume of each blowcase is about 1/5–1/20 of the volume of main pressure vessel 10. In the decaffeination of coffee beans, a blowcase volume of about 1/10 of the volume of the main pressure vessel is suitable. The volume of the two blowcases is generally about the same. However, where the column is to be maintained filled with particulate solids during processing, a "heel" of particulate solids may be maintained in the bottom of the upper blowcase. In that event, the upper blowcase should be larger, for example up to 20% larger, than the lower blowcase.

In accordance with the present invention, intermediate pressure vessel 60 is provided for storing the treating fluid at an intermediate, non-supercritical pressure, which is substantially greater than atmospheric pressure and substantially less than the supercritical operating pressure. The fluid is introduced into the intermediate pressure vessel 60 via pump 96 such that it is present in pressure vessel 60 in both a liquid state 98 and a gaseous state 100.

Supercritical operating pressure in column 10 may be about 3000–5000 psi, typically about 3500–4500 psi in the case of carbon dioxide. Intermediate pressure in vessel 60 is, suitably, 600–1080 psi, typically about 800–900 psi. As explained above, the liquid carbon dioxide in the intermediate pressure vessel 60 is used to assist in the pressurization and depressurizing of the blowcases. However, the initial step of pressurizing the blowcases with gas from vessel 60 reduces the cooling effect that would be produced by venting the intermediate pressure liquid into the blowcase at substantially atmospheric pressure. However, in order to raise the pressure in the blow cases to the supercritical operating pressure, it is necessary to introduce a substantial mass of carbon dioxide into the blowcases. For this reason, it is preferred to pressurize the blowcases utilizing a substantial quantity of carbon dioxide in the liquid state. To achieve this, it is necessary to maintain a substantial pressure differential between vessel 60 and the blowcases. Accordingly, in the use of supercritical carbon dioxide to decaffeinate moist coffee beans, the gaseous carbon dioxide is utilized to pressurize the vessels to an initial pressure of, for example, about 50–300 psi, preferably about 75–200 psi, and more preferably 75–150 psi.

After initial pressurization with gas, valves 80 and 82 are closed and valves 84 and 86 are opened, introducing liquid carbon dioxide into blowcases 12 and 16. This raises the pressure of blowcases 12 and 16 substantially to the pressure of vessel 60.

Valves 84 and 86 are then closed, and valves 92 and 94 are opened to bring the blowcases up to the supercritical operating pressure of main pressure vessel 10. For depressurizing the blowcases, valves 62 and 64 are opened which permits the high pressure carbon dioxide to flow from the blowcases into intermediate pressure vessel 60. Once the pressure in the blowcases drops sufficiently, compressor 74 is actuated to pump down the blowcases to a lower pressure suitable for venting to the atmosphere. Make-up carbon dioxide introduced into the circulating carbon dioxide loop at 34 is conveniently provided by pump 102 which draws liquid carbon dioxide from intermediate pressure vessel 60. Because the liquid $CO_2$ in vessel 60 is at an elevated pressure, the pumping requirement for adding make-up $CO_2$ to the high pressure loop via pump 102 is substantially reduced, thereby reducing the operating cost and capital cost of pump 102.

What is claimed is:

1. In a method of contacting particulate solid matter with a fluid in an elongate pressure vessel which comprises continuously passing a supercritical fluid through an elongate pressure vessel at supercritical pressure while periodically moving the particulate solid matter through the pressure vessel via isolatable pressurizable vessels, said pressurizable vessels being periodically pressurized to the supercritical pressure of said fluid for facilitating the periodic movement of particulate solid matter between said pressurizable vessels and said pressure vessel, and depressurized for facilitating the periodic movement of said solid particulate solid matter into and out of said pressurizable vessels, the improvement wherein pressurizing said pressurizable vessels comprises:
- (a) maintaining a supply of said fluid at an intermediate, non-critical pressure, at which pressure said fluid exists in both the liquid and gaseous state;
- (b) introducing into said pressurizable vessels said fluid, in the gaseous state, from said supply of said fluid maintained at said intermediate pressure, to raise the pressure within said pressurizable vessels;
- (c) introducing into said pressurizable vessels said fluid, in the liquid state, from said supply of fluid to further raise the pressure within said vessels to approximately the pressure of the fluid in said supply; and
- (d) introducing, into said pressurizable vessels, said fluid in the supercritical state, to further raise the pressure within said vessels to the supercritical state.

2. A method according to claim 1 wherein depressurizing said pressurizable vessels comprises:
- (e) venting supercritical fluid from said pressurizable vessels to said fluid supply whereby the pressure in said pressurizable vessels is reduced to substantially said intermediate pressure;
- (f) pumping fluid from said pressurizable vessels into said fluid supply to lower the pressure in said pressurizable vessels below said intermediate pressure; and
- (g) venting at least one of said pressurizable vessels to atmosphere.

3. A method according to claim 1 wherein said particulate solid matter comprises moistened green coffee beans.

4. A method according to claim 3 wherein said fluid comprises carbon dioxide.

5. A method according to claim 4 wherein said supercritical pressure is about 3000 to 5000 psi.

6. A method according to claim 5 wherein said supercritical pressure is about 3500–4500 psi.

7. A method according to claim 5 wherein said intermediate pressure is about 600–1080 psi.

8. A method according to claim 7 wherein, in step (b), the pressure in said pressurizable vessels is raised to about 50 to 300 psi.

9. A method according to claim 1 wherein said supercritical fluid is maintained at substantially constant temperature and pressure.

10. In a method of introducing particulate solid matter into a pressure vessel through which a fluid continuously flows at high, supercritical, pressure, which comprises introducing the particulate solid matter into an isolatable pressurizable vessel, isolating said pressurizable vessel, increasing the pressure within said pressurizable vessel until the pressure therein is substantially the same as that of the supercritical fluid in said pressure vessel, and discharging the particulate solid matter from said pressurizable vessel to said pressure vessel, the improvement which comprises:
- (a) maintaining a supply of said fluid at an intermediate, non-supercritical pressure, at which pressure said fluid exists in both the liquid and gaseous state;
- (b) introducing into said pressurizable vessel said fluid, in the gaseous state, from said supply of said fluid maintained at said intermediate pressure, to raise the pressure within said pressurizable vessel;
- (c) introducing into said pressurizable vessel said fluid, in the liquid state, from said supply of fluid to further raise the pressure within said vessel to approximately the pressure of the fluid in said supply;
- (d) introducing, into said pressurizable vessel, said fluid in the supercritical state, to further raise the pressure within said vessel to the high, supercritical pressure prevailing in said pressure vessel; and
- (e) placing the pressurizable vessel and the pressure vessel in communication for introducing particulate solids to said pressure vessel from said pressurizable vessel.

11. A method according to claim 10 wherein said particulate solid matter comprises moistened green coffee beans.

12. A method according to claim 11 wherein said fluid comprises carbon dioxide.

13. A method according to claim 12 wherein said supercritical pressure is about 3000 to 5000 psi.

14. A method according to claim 13 wherein said supercritical pressure is about 3500–4500 psi.

15. A method according to claim 13 wherein said intermediate pressure is about 600–1080 psi.

16. A method according to claim 15 wherein, in step (b), the pressure in said pressurizable vessel is raised to about 50 to 300 psi.

17. A method according to claim 10 wherein said supercritical fluid is maintained at substantially constant temperature and pressure.

18. In a method of discharging particulate solid matter into an isolatable pressurizable vessel from a pressure vessel through which a fluid continuously flows at high, supercritical, pressure which comprises isolating said pressurizable vessel, increasing the pressure in said pressurizable vessel until the pressure therein is substantially the same as that of the supercritical fluid in said pressure vessel, and discharging the particulate solid matter from said pressure vessel to said pressurizable vessel, the improvement which comprises
- (a) maintaining a supply of said fluid at an intermediate, non-supercritical pressure, at which pressure said fluid exists in both the liquid and gaseous state;
- (b) introducing into said pressurizable vessel said fluid, in the gaseous state, from said supply of said fluid maintained at said intermediate pressure, to raise the pressure within said pressurizable vessel;
- (c) introducing into said pressurizable vessel said fluid, in the liquid state, from said supply of fluid to further raise the pressure within said vessel to approximately the pressure of the fluid in said supply;
- (d) introducing, into said pressurizable vessel, said fluid in the supercritical state, to further raise the pressure within said vessel to the high, supercritical pressure prevailing in said pressure vessel; and
- (e) placing the pressurizable vessel and pressure vessel in communication for discharging particulate solids from said pressure vessel to said pressurizable vessel.

19. A method according to claim 18 wherein said particulate solid matter comprises moistened green coffee beans.

20. A method according to claim 19 wherein said fluid comprises carbon dioxide.

21. A method according to claim 20 wherein said supercritical pressure is about 3000 to 5000 psi.

22. A method according to claim 21 wherein said supercritical pressure is about 3500–4500 psi.

23. A method according to claim 21 wherein said intermediate pressure is about 600–1080 psi.

24. A method according to claim 23 wherein, in step (b), the pressure in said pressurizable vessel is raised to about 50 to 300 psi.

25. A method according to claim 18 wherein said supercritical fluid is maintained at substantially constant temperature and pressure.

26. In an apparatus for continuously passing a fluid at high operating pressure through a pressure vessel for contacting particulate solids in said pressure vessel while periodically moving particulate solids downwardly through said pressure vessel, said apparatus comprising:
  a pressure vessel;
  an upper pressurizable vessel receiving particulate solids at substantially atmospheric pressure and for charging said solids into said pressure vessel at said high operating pressure;
  a lower pressurizable vessel for receiving a quantity of particulate solids discharged from said pressure vessel at said high operating pressure and for discharging said particulate solids at low pressure;
  means for continuously passing a fluid at high operating pressure through said pressure vessel for contacting particulate solids therein;
  means for periodically increasing the pressure in said upper and lower pressurizable vessels to facilitate periodic charging of particulate solids from said upper pressurizable vessel into the upper end of said pressure vessel and periodic discharging of particulate solids from the lower end of said pressure vessel into said lower pressurizable vessel;
  means for periodically decreasing the pressure in said upper and lower pressurizable vessels to facilitate introduction of particulate solids into said upper pressurizable vessel at atmospheric pressure and periodic discharge of particulate solids from said lower pressurizable vessel at low pressure; the improvement which comprises:
  an intermediate pressure vessel for storing said fluid at an intermediate pressure which is substantially greater than atmospheric pressure and substantially less than said high operating pressure;
  wherein said means for periodically increasing said pressure in said upper and lower pressurizable vessels comprises:
  means for conveying fluid in the gaseous and liquid state from said intermediate pressure vessel to said upper and lower pressurizable vessels to raise the pressure therein to said intermediate pressure; and
  means for conveying said fluid at said high operating pressure to said upper and lower pressurizable vessels to raise the pressure therein to said high operating pressure; and
  wherein said means for periodically decreasing the pressure in said upper and lower pressurizable vessels comprises:
  means for conveying fluid at said high operating pressure from said upper and lower pressurizable vessels to said intermediate pressure vessel to lower the pressure to said intermediate pressure; and
  means for pumping said fluid from said upper and lower pressurizable vessels into said intermediate pressure vessel to lower the pressure below said intermediate pressure.

27. Apparatus according to claim 26 wherein said pressure decreasing means further comprises means for venting said upper pressurizable vessel to atmosphere.

28. Apparatus according to claim 26 wherein said fluid conveying means for raising the pressure in said pressurizable vessels to said intermediate pressure comprises:
  gas conveying means for conveying said fluid in the gaseous state from said intermediate pressure vessel to said pressurizable vessels to raise the pressure therein to a pressure below said intermediate pressure;
  an intermediate pressure vessel for storing said fluid at an intermediate, non-supercritical pressure which is substantially greater than atmospheric pressure and substantially less than said high operating pressure; and
  means for interconnecting said upper and lower pressurizable vessels in fluid communication with said intermediate pressure vessel to enable said pressurizable vessel to be pressurized or depressurized to said intermediate pressure.

29. Apparatus according to claim 26 wherein said means for continuously passing said fluid through said pressure vessel at high operating pressure comprises a pump for circulating said fluid at high pressure through a high pressure circulation loop which includes said vessel, and wherein said apparatus further comprises means for placing the upper pressurizable vessel in fluid communication with the outlet side of said pump for enhancing the charging of particulate solids from said upper pressurizable vessel into said pressure vessel and means for placing the lower pressurizable vessel in fluid communication with the inlet side of said pump for enhancing the discharge of particulate solids from said pressure vessel into said lower pressurizable vessel.

30. Apparatus according to claim 26 for placing said upper and lower pressurizable vessels in fluid communication to enable fluid displaced from said lower pressurizable vessel by the discharge of particulate solids thereinto from said pressure vessel to flow to said upper pressurizable vessel.

31. In an apparatus for continuously contacting particulate solids in an elongate column by continuously flowing a supercritical fluid at high pressure through a bed of solids in the column while periodically moving the particulate solids downwardly through the column, said apparatus comprising:
  an elongate, substantially vertical pressure vessel;
  an upper isolatable pressurizable vessel for periodically introducing particulate solids into the top of the pressure vessel;
  means for increasing the pressure in said upper pressurizable vessel to said high pressure for introduction of particulate solids from said upper pressurizable vessel to said pressure vessel;
  means for decreasing the pressure in said upper pressurizable vessel from said high pressure for introduction of a fresh supply of particulate solids to said pressurizable vessel;
  a lower isolatable pressurizable vessel for periodically receiving particulate solids discharged from the lower end of the pressure vessel;
  means for increasing the pressure in said lower pressurizable vessel to said high pressure for receiving particulate solids discharged from said pressure vessel; and means for decreasing the pressure in said lower pressurizable vessel from said high pressure for discharging particulate solids from said lower pressurizable vessel; and pump means for continuously circulating a flow of supercritical fluid at high pressure through said column for contacting particulate solids therein;

the improvement wherein said apparatus further comprises:

means for interconnecting the outlet side of said circulating pump means in fluid communication with said upper pressurizable vessel for facilitating discharge of particulate solids from said upper pressurizable vessel into said pressure vessel; and means for interconnecting the inlet side of said circulating pump means in fluid communication with said lower pressurizable vessel for facilitating discharge of particulate solids from said pressure vessel into said lower pressurizable vessel.

* * * * *